(12) United States Patent
Saka

(10) Patent No.: US 9,730,304 B2
(45) Date of Patent: Aug. 8, 2017

(54) DISCHARGE LAMP LIGHTING APPARATUS

(71) Applicant: USHIO DENKI KABUSHIKI KAISHA, Tokyo (JP)

(72) Inventor: Kosuke Saka, Himeji (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/323,572

(22) PCT Filed: Jun. 29, 2015

(86) PCT No.: PCT/JP2015/068615
§ 371 (c)(1),
(2) Date: Jan. 3, 2017

(87) PCT Pub. No.: WO2016/006485
PCT Pub. Date: Jan. 14, 2016

(65) Prior Publication Data
US 2017/0142816 A1 May 18, 2017

(30) Foreign Application Priority Data

Jul. 10, 2014 (JP) ................. 2014-142722

(51) Int. Cl.
*H05B 41/16* (2006.01)
*H05B 41/24* (2006.01)
(Continued)

(52) U.S. Cl.
CPC ......... *H05B 41/36* (2013.01); *G03B 21/2026* (2013.01); *G03B 21/2053* (2013.01); *H05B 41/24* (2013.01)

(58) Field of Classification Search
None
See application file for complete search history.

(56) References Cited

U.S. PATENT DOCUMENTS

2003/0080693 A1 5/2003 Ono et al.
2005/0206326 A1 9/2005 Suzuki et al.
(Continued)

FOREIGN PATENT DOCUMENTS

JP 2003-133091 A 5/2003
JP 2006-059790 A 3/2006
(Continued)

OTHER PUBLICATIONS

Notification of Transmittal of Translation of the International Preliminary Report on Patentability and Translation of Written Opinion of the International Searching Authority; PCT/JP2015/088615 issued on Jan. 19, 2017.
(Continued)

*Primary Examiner* — Anh Tran
(74) *Attorney, Agent, or Firm* — Studebaker & Brackett PC

(57) ABSTRACT

A discharge lamp lighting apparatus is provided with a pulse generation part, and a power supply part converts DC applied voltage into alternating current corresponding to a frequency of the pulse, and supplies the alternating current to the discharge lamp. The pulse generation part is structured to alternately output a first pulse and a second pulse that has a lower frequency than the first pulse. The frequency of the second pulse is set to a predetermined reference frequency when a value of the applied voltage coincides with a predetermined reference value, is set to a lower frequency than the reference frequency when the value of the applied voltage exceeds the reference value, and is set to a frequency that is equal to or lower than the reference frequency when the value of the applied voltage falls below the reference value.

4 Claims, 12 Drawing Sheets

(51) Int. Cl.
H05B 41/36 (2006.01)
G03B 21/20 (2006.01)

(56) References Cited

U.S. PATENT DOCUMENTS

| | | | | |
|---|---|---|---|---|
| 2010/0148686 A1* | 6/2010 | Arimoto | ............ | H05B 41/2883 |
| | | | | 315/246 |
| 2011/0025989 A1* | 2/2011 | Ono | ................... | H05B 41/2928 |
| | | | | 353/85 |
| 2012/0313546 A1* | 12/2012 | Imamura | ............ | H05B 41/2888 |
| | | | | 315/287 |
| 2014/0167641 A1 | 6/2014 | Imamura et al. | | |

FOREIGN PATENT DOCUMENTS

| | | | |
|---|---|---|---|
| JP | 2009-252352 A | 10/2009 |
| JP | 2010-140732 A | 6/2010 |
| JP | 2013-033605 A | 2/2013 |

OTHER PUBLICATIONS

International Search Report issued in PCT/JP2015/068615; mailed Sep. 1, 2015.
An Office Action; "Decision to Grant a Patent," issued by the Japanese Patent Office on Jan. 27, 2016, which corresponds to Japanese Patent Application No. 2014-142722.

* cited by examiner

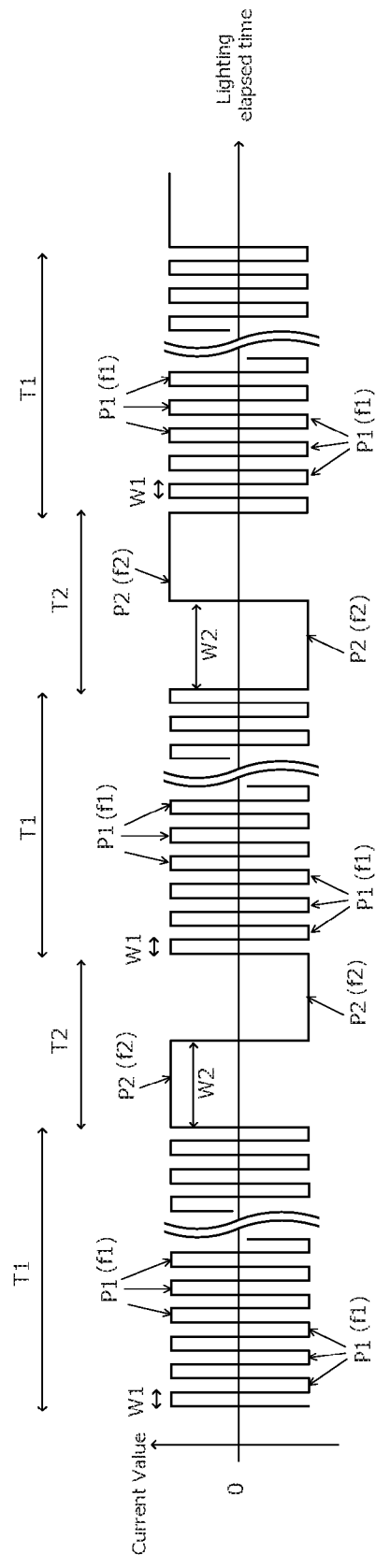

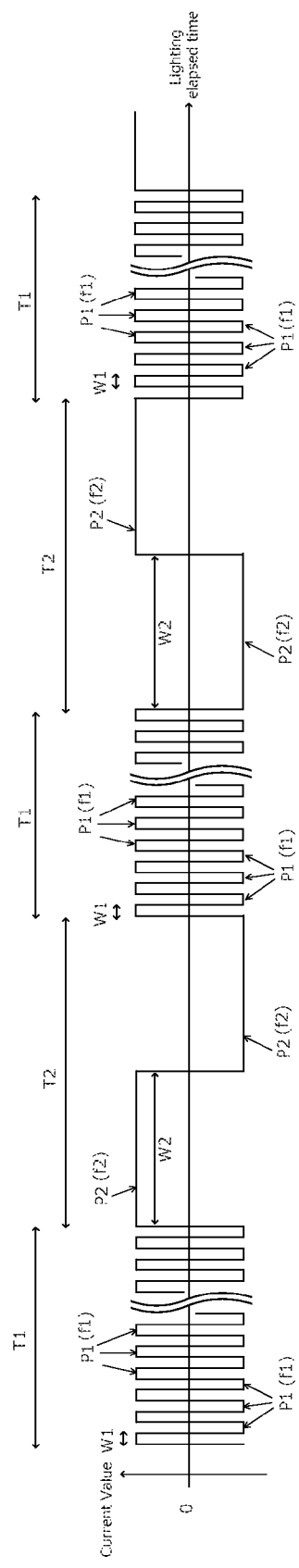

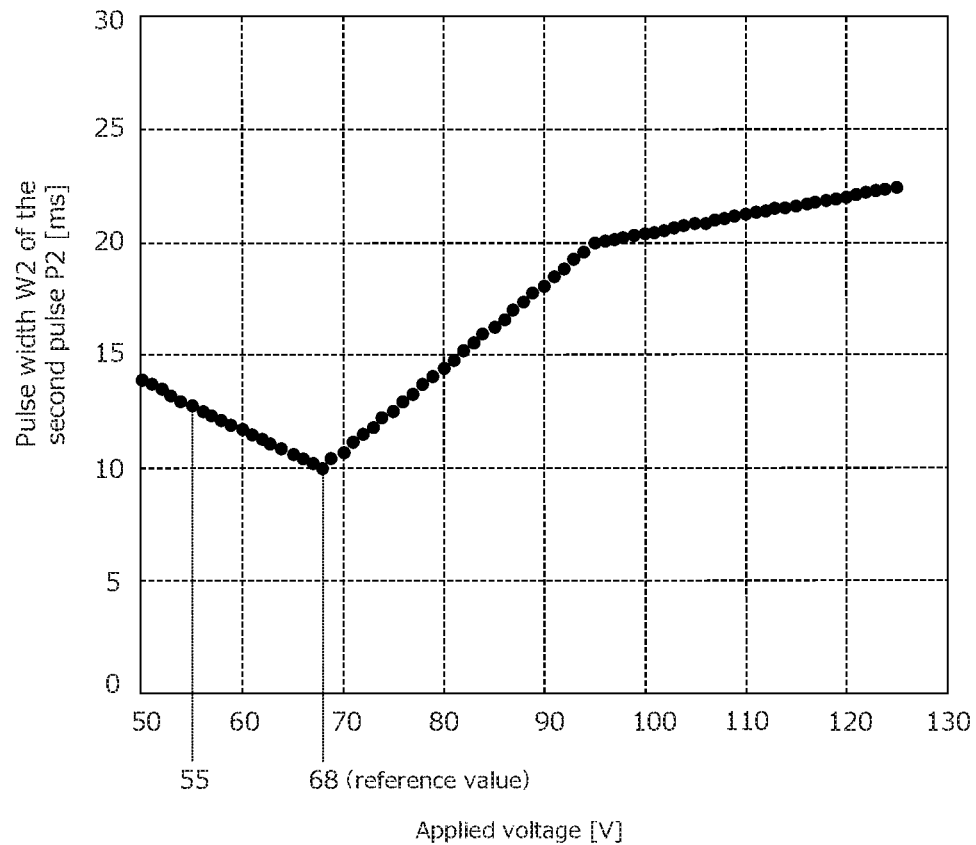

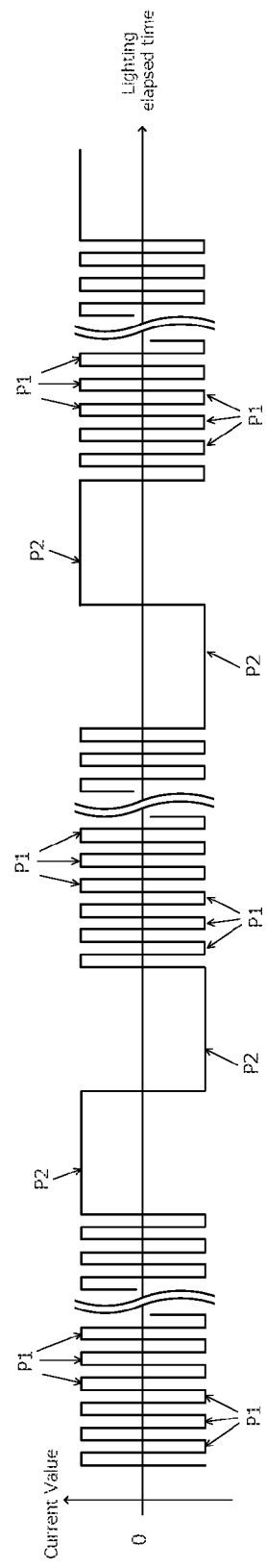

DISCHARGE LAMP LIGHTING APPARATUS

TECHNICAL FIELD

The present invention relates to a lighting apparatus of a discharge lamp which is preferably used for a light source such as a projector.

BACKGROUND ART

A discharge lamp having a high mercury vapor pressure is used for a light source of a projector device. In such a high-voltage mercury lamp, the light in a visible wavelength region can be obtained with a high output by making the mercury vapor pressure high.

The discharge lamp has a light emitting part which is formed by a discharge vessel and has a substantially spherical shape, and a pair of electrodes is arranged in the light emitting part so as to be opposite to each other with an extremely small distance, for example, 2 mm or less.

In the case that the discharge lamp described above is lighted in the same state for a long period, a plurality of minute protrusions may be formed due to a high temperature, or minute irregularities may be generated in the tip surface of the electrodes. The minute protrusions and the irregularities are generated by the melting of a material (for example, tungsten) constituting the electrodes and the aggregation of a chemical compound generated by being bonded to gas which is sealed within the light emitting part, and this existence changes the shape of the surface of the tip of the electrode. It has been known that a starting point of an arc moves in conjunction with this, the discharge position becomes unstable, and there has been a problem that a flickering of a projection light called as a flicker is generated.

In order to solve such a problem, Patent Document 1 discloses an illumination system of a discharge lamp which supplies a current pulse P1 having a predetermined frequency (a fundamental frequency) to a discharge lamp and which intermittently or periodically inserts a current pulse P2 having a lower frequency than the fundamental frequency to the current pulse P1 (refer to FIG. 9).

A period that one electrode is fixed to an anode and the other electrode is fixed to a cathode, that is, a period that a high voltage is applied between both the electrodes becomes longer by setting the frequency of the current pulse to the low frequency. As a result, a heating degree applied to the electrode is enhanced, and it is possible to transmit the heat not only to the tip of the electrode, but also to a position which is away from the tip. Therefore, the heat is transmitted to the position which is away from the tip of the electrode during the application of the current pulse having the low frequency, and it is possible to melt and evaporate the minute protrusions or the irregularities which are generated at the positions. As a result, it is possible to eliminate the protrusions and the irregularities in the other positions than the tip of the electrode which may adversely affect, and it is possible to stabilize a luminescent spot of the arc.

Meanwhile, the constant power lighting control is generally carried out by the power supply part (the power supply device) in the discharge lamp. This control is carried out for the purpose of stably keeping a light output from the discharge lamp and for the purpose of fixedly keeping a load applied to the discharge lamp, in more detail, a thermal load applied to a discharge vessel which is constructed by a quartz glass.

In the discharge lamp, the electrode is consumed with an elapse of the lighting time, and the distance between the electrodes is elongated. When the distance between the electrodes is elongated, the voltage (the lamp voltage) applied to the discharge lamp comes up. As a result, the current (the lamp current) applied to the discharge lamp is lowered under the constant power lighting control. When the lamp current is lowered, a thermal inflow to the electrode is reduced. Therefore, even if the pulse P2 having the low frequency is supplied to the discharge lamp under this state, an amount of heat flowing into the electrode is reduced, and the effect of eliminating the protrusions or the irregularities in the other positions than the tip of the electrode described above is lowered.

In view of this point, Patent Document 2 discloses an illumination system of a discharge lamp which detects a change of a lamp voltage and controls to further lower a frequency of a current pulse having a low frequency (make a pulse width long) in the case that the lamp voltage comes up, that is, in the case that the lamp current comes down.

PRIOR ART DOCUMENT

Patent Documents

Patent Document 1: JP-A-2006-59790
Patent Document 2: JP-A-2013-33605

SUMMARY OF THE INVENTION

Problems to be Solved by the Invention

In recent years, a discharge lamp having a further longer lighting time has been required. An object of the present invention is to achieve an illumination system which can achieve a longer service life of a discharge lamp than the case of being lighted by the conventional illumination system described above.

Means for Solving the Problem

The inventor has found that a service life property is improved by lighting under a low applied voltage, as a result of intensive research. The present invention has been made under this new knowledge.

The present invention is a discharge lamp lighting apparatus for supplying alternating current to a discharge lamp having a pair of electrodes arranged to be opposite to each other within a discharge vessel in which a predetermined gas is sealed, the discharge lamp lighting apparatus comprising:
 a pulse generation part that generates pulse; and
 a power supply part that transforms supplied DC voltage to DC applied voltage, converts the DC applied voltage into the alternating current corresponding to a frequency of the pulse, and supplies the alternating current to the discharge lamp, wherein
 the pulse generation part is structured to alternately output a first pulse and a second pulse that has a lower frequency than the first pulse, set a frequency of the second pulse to a predetermined reference frequency when a value of the applied voltage coincides with a predetermined reference value, set the frequency of the second pulse to a lower frequency than the reference frequency when the value of the applied voltage exceeds the reference value, and set the frequency of the second pulse to a frequency that is equal to or lower than the reference frequency when the value of the applied voltage falls below the reference value.

In the illumination system described in Patent Document 2, the frequency of the current pulse having the low frequency is lowered when the applied voltage comes up, and the frequency of the pulse having the low frequency is raised when the applied voltage comes down.

It is possible to increase the amount of heat supplied to the electrode by making the time for maintaining the polarity of the voltage applied between a pair of electrodes constant (preventing the polarity from being reversed) on the basis of the lowering of the frequency of the current pulse having the low frequency. As a result, it is possible to melt and evaporate the extra protrusions or irregularities by raising the temperature of the electrode. The evaporated electrode material is shifted to a direction where the distance between the electrodes becomes short, by being thereafter aggregated to the tip of the electrode. As a result, the applied voltage moves to a direction where the voltage is lowered. As long as an amount of evaporation and an amount of aggregation of the electrode material are balanced, the applied voltage can be kept constant. However, as the lighting time is longer, the amount of evaporation exceeds the amount of aggregation due to the attachment of the electrode material to the discharge vessel. Therefore, the distance between the electrodes is unavoidably elongated, and the rising of the applied voltage is unavoidable.

By virtue of the opposite reason, the amount of head supplied to the electrode is lowered by raising the frequency of the current pulse having the low frequency. Therefore, the amount of evaporation of the electrode material is lowered. Accordingly, the amount of thereafter aggregation of the electrode material is lowered, and the distance between the electrodes is shifted to the direction where the distance is elongated. As a result, the applied voltage moves to the direction where the voltage is increased.

That is, the lighting method described in Patent Document 2 intends to make the applied voltage, that is, the distance between the electrodes as constant as possible. However, the applied voltage actually comes up as the lighting time becomes longer, as mentioned already.

On the contrary, the method according to the present invention makes a frequency of a low-frequency pulse (a second pulse) low in the case that an applied voltage is high, that is, a value of the applied voltage goes beyond a predetermined reference value, and sets the frequency of the second pulse to a frequency which is equal to or less than a reference frequency in the case that the applied voltage is low, that is, the value of the applied voltage falls below the reference value.

Here, the purpose for making the frequency of the second pulse low in the case that the applied voltage is high is the same as that of the illumination system described in Patent Document 2. On the other hand, in the case that the applied voltage is low, the frequency of the second pulse is set to be high in the illumination system described in Patent Document 2. On the contrary, the frequency of the second pulse is set to the frequency which is equal to or less than the reference frequency in the structure according to the present invention. As mentioned above, taking into consideration the matter that the frequency of the second pulse is set to the reference frequency in the case that the applied voltage is the reference value, the structure according to the present invention, in which the frequency of the second pulse is set to be equal to or less than the reference frequency in the case that the applied voltage falls below the reference value, is widely different from the illumination system described in Patent Document 2. This structure aims at controlling the frequency of the second pulse to a direction which further lowers the applied voltage intentionally in a state where the applied voltage (the lamp voltage) is low.

As mentioned above, in the discharge lamp, the electrode consumes with the elapse of the lighting time, the distance between the electrodes becomes long, and the applied voltage comes up. On the contrary, in an initial stage of the lighting, the electrode tip shape does not wear, and the electrode material necessary for generating the protrusions exists sufficiently. As a result, the discharge lamp can be lighted by the low applied voltage at the initial stage.

Here, in the case that the frequency of the low-frequency pulse (the second pulse) is lowered at the initial stage where the electrode material exists sufficiently, an amount of heat supplied to the electrode is increased, and an amount of the evaporating electrode material is increased. Therefore, an amount of the electrode material which is aggregated thereafter is increased, and the distance between the electrodes becomes short. As a result, the applied voltage further comes down.

That is, the period which can light the discharge lamp with the low applied voltage becomes long by employing the above-mentioned control. As a result, it is possible to light the discharge lamp over a longer time than the case of lighting by the conventional illumination system.

Further, the pulse generation part may be structured so as to lower the frequency of the second pulse as the value of the applied voltage comes away from the reference value in the case that the value of the applied voltage falls below the reference value, in addition to the above structure.

According to the structure mentioned above, it is possible to light with the further lower applied voltage in the case that the discharge lamp can be lighted by the low applied voltage. As a result, it is possible to further enhance the long service life of the discharge lamp.

The pulse generation part may be provided with a frequency setting part which sets the frequency, and a pulse generation circuit which generates and outputs the pulse having the frequency set by the frequency setting part. At this time, the frequency setting part can be structured so as to set the frequency of the second pulse corresponding to the value of the applied voltage.

In detail, the discharge lamp lighting apparatus may include a power control part that detects the applied voltage and applied power, and controls a ratio of transformation at a time of transforming from the DC voltage to the applied voltage so as to maintain the applied power which is detected to a predetermined power value, wherein the pulse generation part is provided with a frequency setting part that sets a frequency, and a pulse generation circuit that generates and outputs the pulse having the frequency set by the frequency setting part, and the frequency setting part sets the frequency of the second pulse corresponding to a value of the applied voltage which is detected based on a signal from the power control part.

Effect of the Invention

According to the discharge lamp lighting apparatus according to the present invention, it is possible to make the lighting time of the discharge lamp longer than the conventional case, and it is possible to achieve a long service life of the discharge lamp.

BRIEF DESCRIPTION OF THE DRAWINGS

FIG. 3B is a view showing an example of the waveform of the lamp current which is supplied from the discharge lamp lighting apparatus;

FIG. 3C is a view showing an example of the waveform of the lamp current which is supplied from the discharge lamp lighting apparatus;

FIG. 4 shows an example of a graph showing a relationship between an applied voltage and a second pulse P2;

FIG. 9 is a view showing an example of a conventional lamp current waveform.

MODE FOR CARRYING OUT THE INVENTION

A description will be given of an embodiment of a discharge lamp lighting apparatus according to the present invention with reference to the accompanying drawings. Here, prior to the description relating to a structure of the lighting apparatus, a description will be given of an example of a structure of a discharge lamp to be supplied alternating current by the lighting apparatus, with reference to the accompanying drawings. A dimensional rate of the drawings and an actual dimensional rate do not necessarily coincide in the respective drawings.

[Structure of Lamp]

Figure 1A:
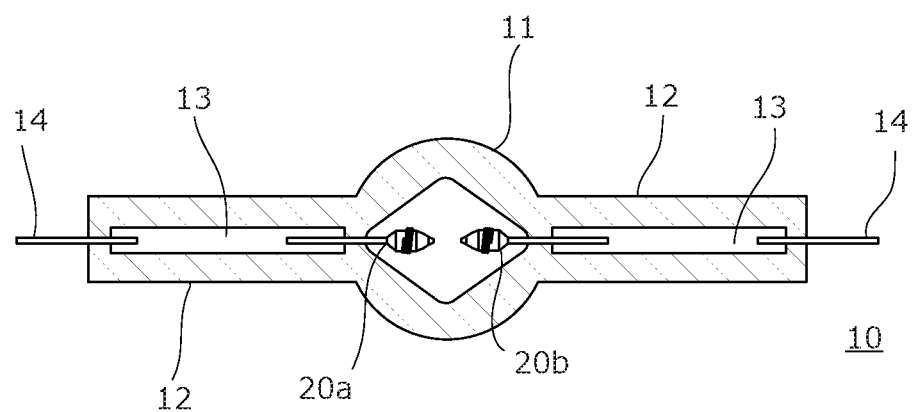
FIG. 1A is a cross-sectional schematic view showing a discharge lamp.
Figure 1B:
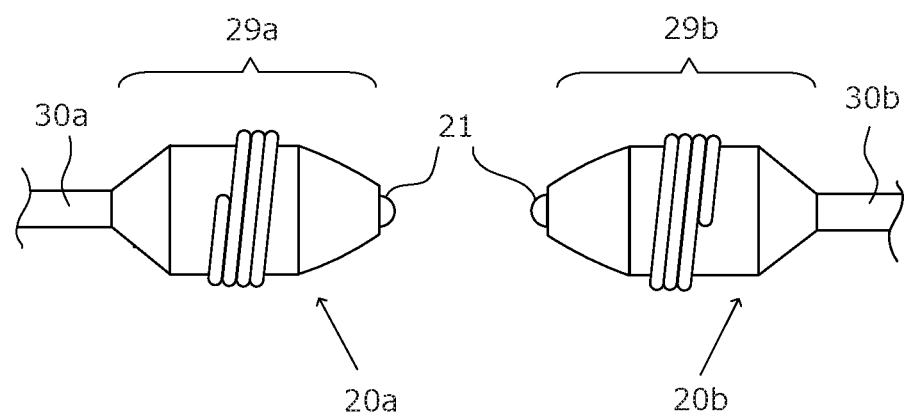
FIG. 1B is a cross-sectional schematic view showing the vicinity of an electrode tip of the discharge lamp in an enlarged manner.

Schematic views of a cross section of the discharge lamp are shown in FIGS. 1A and 1B. FIG. 1B is a schematic view of the cross section obtained by enlarging a leading end of an electrode in FIG. 1A.

A discharge lamp 10 has an approximately spherical light emitting part 11 which is formed by a discharge vessel made of quartz glass. The material of the discharge vessel is not limited to the quartz glass, but the discharge vessel may include the other materials.

A pair of electrodes 20a and 20b are arranged in the light emitting part 11 so as to face each other at an extremely small distance, for example, 2 mm or less.

Further, sealing parts 12 are formed in both end portions of the light emitting part 11. A conducting metal foil 13 including molybdenum is buried in an airtight manner in the sealing part 12, for example, by a shrink seal. Shaft parts of electrodes 20a and 20b are bonded to one ends of the metal foils 13, outer leads 14 are bonded to the other ends of the metal foils 13, and electric power is supplied from the discharge lamp lighting apparatus according to the present invention mentioned later.

Mercury, noble gas and halogen gas are encapsulated in the light emitting part 11 of the discharge lamp 10.

The mercury is provided for obtaining radiated light with a necessary visible wavelength, for example, a wavelength between 360 and 780 nm, and is encapsulated at 0.20 mg/mm$^3$, concretely. The encapsulating amount is differentiated by a temperature condition, and realizes high vapor pressure such as 200 atmospheres or higher as pressure in an inner section of the light emitting part at the lighting time. Further, it is possible to produce a discharge lamp having high mercury vapor pressure of 250 atmospheres or higher or 300 atmospheres or higher at the lighting time, by encapsulating the mercury more. As the mercury vapor pressure increases, the light source more suitable for the projector can be achieved.

For example, argon gas is encapsulated as the noble gas at about 13 kPa. A function thereof is to improve a starting performance for lighting.

Further, iodine, bromine or chlorine is encapsulated as halogen gas in a chemical compound mode with the mercury or the other metals. An encapsulating amount of the halogen is selected from a range between $10^{-6}$ μmol/mm$^3$ and $10^{-2}$ μmol/mm$^3$. The greatest reason for encapsulating the halogen is to make a service life of the discharge lamp utilizing a so-called halogen cycle longer. Further, in the case where the discharge lamp 10 is made extremely compact and is set to an extremely high lighting vapor pressure, it is also possible to obtain an action of preventing devitrification of the discharge vessel by encapsulating the halogen. The devitrification means that the crystallization makes progress from a metastable glass state and changes to an aggregation of the crystal grain which is grown from a lot of crystal nucleuses. If such phenomenon is generated, the light is scattered by the crystal grain boundary and the discharge vessel becomes opaque.

As long as the same function can be realized, the gas encapsulated in the light emitting part 11 is not limited to the gas mentioned above.

As one example, the discharge lamp 10 may be structured such that the maximum outer diameter of the light emitting part is 9.4 mm, a distance between the electrodes is 1.0 mm, the discharge vessel internal volume is 55 mm$^3$, the rated voltage is 70 V, the rated power is 180 W, and the electric power is supplied with an AC system.

Further, on the assumption that the discharge lamp 10 is used by being embedded in the projection which has been made progress of being made compact in recent years, the discharge lamp 10 is required to be extremely downsized in its whole dimension, and a higher amount of light emission is required on the other hand. As a result, the thermal influence within the light emitting part is extremely severe, and a tube wall load value of the lamp is between 0.8 and 2.5 W/mm$^2$, specifically 2.4 W/mm$^2$. As mentioned above, in the case where the discharge lamp 10 having the higher mercury vapor pressure and tube wall load value is mounted to equipment for presentation such as a projector or an overhead projector, the radiated light having good color rendering properties can be provided for the equipment for presentation.

[Shape of Leading End of Electrode]

As shown in FIG. 1B, the electrode 20a includes a head part 29a and a shaft part 30a, and the electrode 20b includes a head part 29b and a shaft part 30b. Further, a protrusion 21 is formed in a leading end of each of the electrode 20a and the electrode 20b. The protrusion 21 is formed by aggregation of an electrode material which is fused in the leading end of the electrode at the lamp lighting time. In the present embodiment, a description will be given on the assumption that both of the electrode 20a and the electrode 20b include tungsten; however, the material is not limited to this.

When the electrode 20a and the electrode 20b are energized, they become incandescent to a high temperature, and the tungsten constituting them is sublimated. The sublimated tungsten is combined with the encapsulated halogen gas in an inner wall surface area of the light emitting part 11 which is a comparatively low temperature section, and a halogenated tungsten is formed. Since the halogenated tungsten is comparatively higher in its vapor pressure, the halogenated tungsten is again moved near to the leading ends of the electrode 20a and the electrode 20b in a gas state. Further, when the halogenated tungsten is reheated at this position, the halogenated tungsten is separated into the halogen and the tungsten. Among them, the tungsten is returned to the leading ends of the electrode 20a and the electrode 20b so as to be aggregated, and the halogen is returned as the halogen gas within the light emitting part 11. This corresponds to "halogen cycle" mentioned above. The protrusion 21 is formed by attachment of the aggregated tungsten to the vicinity of the leading ends of the electrode 20a and the electrode 20b.

[Structure of Lighting Apparatus]

Figure 2:
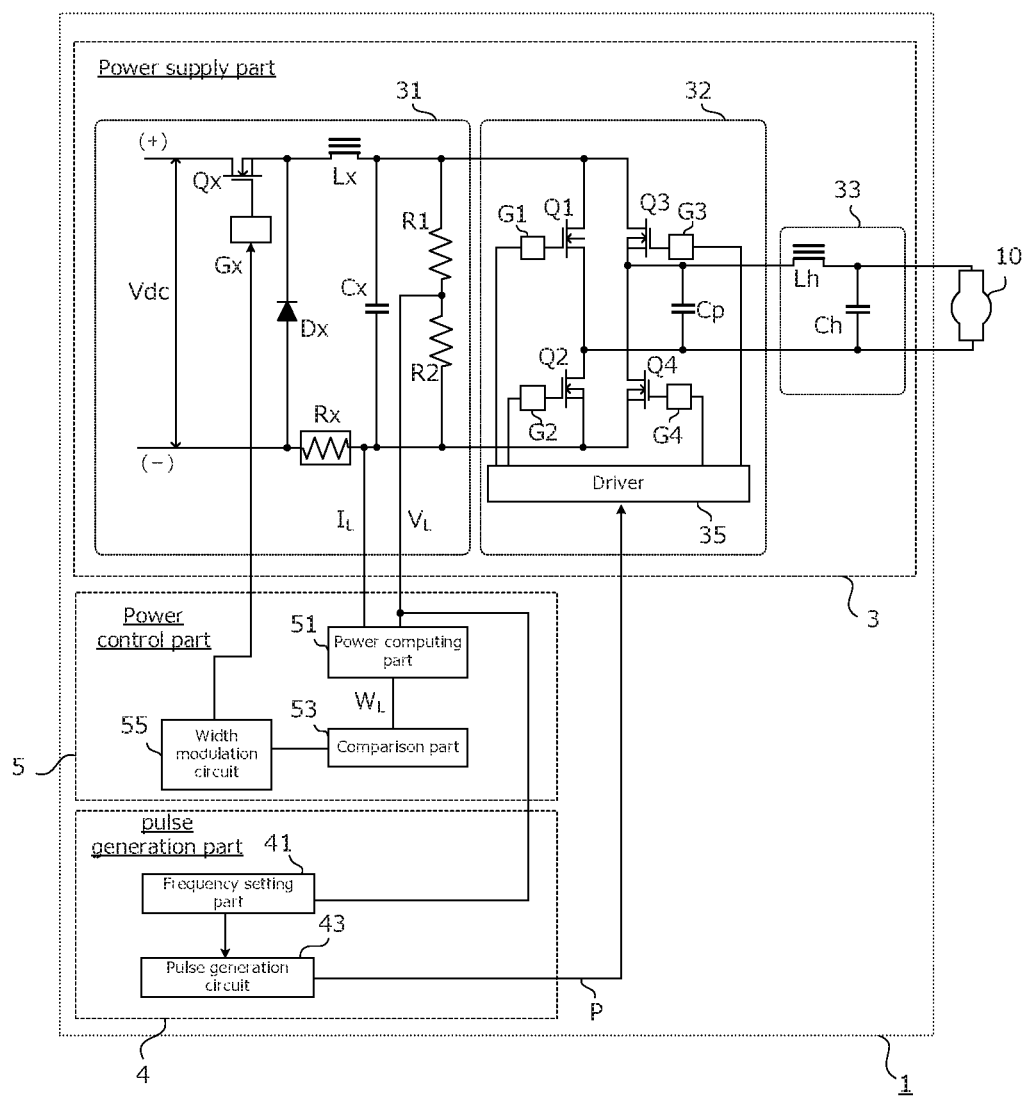
FIG. 2 is a circuit block diagram schematically showing a structure of a discharge lamp lighting apparatus.

FIG. 2 is a circuit block diagram schematically showing a structure of the discharge lamp lighting apparatus according to the present invention. As shown in FIG. 2, the lighting apparatus 1 includes a power supply part 3, a pulse generation part 4 and a power control part 5. The pulse generation part 4 is provided with a frequency setting part 41 and a pulse generation circuit 43, and a pulse P having a frequency set by the frequency setting part 41 is generated in the pulse generation circuit 43 and is supplied to the power supply part 3. The power supply part 3 generates an alternating current on the basis of a signal (corresponding to a gate signal Gx in FIG. 2) relating to a control power value which is output from the power control part 5, and the pulse P, and supplies the alternating current to the discharge lamp 10. The discharge lamp 10 is lighted by the alternating current supplied.

<Power Supply Part 3>

The power supply part 3 is provided with a step-down chopper part 31, a DC/AC conversion part 32 and a starter part 33.

The step-down chopper part 31 steps down a DC voltage Vdc to be supplied, to a desired DC voltage (DC applied voltage), and outputs the DC applied voltage to the DC/AC conversion part 32 in the subsequent stage. In FIG. 2, the step-down chopper part 31 is illustrated as a step-down chopper having a switching element Qx, a reactor Lx, a diode Dx, a smoothening capacitor Cx, a resistance Rx and a voltage dividing resistance (R1, R2), as a specific construction example.

The switching element Qx has one end connected to a positive side power terminal to which the DC voltage Vdc is supplied, and has the other end connected to one end of the reactor Lx. The diode Dx is structured such that a cathode terminal is connected to a connecting point of the switching element Qx and the reactor Lx, and an anode terminal is connected to a negative side power terminal. The smoothening capacitor Cx has one end (positive side terminal) connected to an output side terminal of the reactor Lx, and has the other end (negative side terminal) connected to an output side terminal of the resistance Rx. The resistance Rx is connected between the negative side terminal of the smoothening capacitor Cx and the anode terminal of the diode Dx, and realizes a function of detecting electric current. Further, the voltage dividing resistance Vx is connected between the negative side terminal and the positive side terminal of the smoothening capacitor Cx, and realizes a function of detecting electric voltage. Further, the voltage dividing resistances (R1, R2) are connected between a minus side terminal and a plus side terminal of the smoothening capacitor Cx and achieves a function of detecting the voltage.

The switching element Qx is driven by the gate signal Gx output from a power control part 5. On the basis of a duty of the gate signal Gx, the step-down chopper part 31 steps down the DC voltage Vdc to the voltage corresponding to the duty so as to output to the DC/AC conversion part 32 in the latter stage. That is, the applied voltage to the discharge lamp 10 is decided by the signal from the power control part 5.

The DC/AC conversion part 32 converts the input DC voltage to the AC voltage having a desired frequency, and outputs the AC voltage having a desired frequency to the starter part 33 in the subsequent stage. In FIG. 2, the DC/AC conversion part 32 including the switching elements Q1 to Q4 which are connected like a bridge is shown as a specific construction example (a full bridge circuit).

The switching element Q1 is driven by a gate signal G1 which is output from the driver 35. In the same manner, the switching element Q2 is driven by a gate signal G2, the switching element Q3 is driven by a gate signal G3, and the switching element Q4 is driven by a gate signal G4. The driver 35 outputs the gate signal to a group of the switching elements Q1 and Q4 arranged diagonally, and a group of the switching elements Q2 and Q3 so as to alternately repeat ON and OFF. As a result, the AC voltage having a rectangular waveform is generated between a connecting point of the switching elements Q1 and Q2, and a connecting point of the switching elements Q3 and Q4.

The starter part 33 is the circuit section for boosting the AC voltage supplied from the DC/AC part 32 at the discharge lamp starting time and supplying the boosted AC voltage to the discharge lamp 10. In FIG. 2, the starter part 33 including a coil Lh and a capacitor Ch is shown as a specific construction example. The high electric voltage necessary for starting the discharge lamp is created in a secondary side of the starter part 33 by applying the AC voltage having a high switching frequency (for example, several hundred kHz) near a resonance frequency of an LC series circuit including a coil Lh and a capacitor Ch from the DC/AC part 32 at the discharge lamp starting time, and is supplied to the discharge lamp 10. After the discharge lamp is lighted, a steady-state lighting motion is carried out by transferring the frequency of the AC voltage supplied from the DC/AC part 32 to a steady-state frequency (for example, 60 to 1000 Hz). The steady-state frequency corresponds to a frequency having a pulse P1 mentioned later.

In the circuit, the frequency change in the AC voltage to be supplied to the starter part 33 can be achieved by regulating a cycle of switching the On and OFF of the group of the switching elements Q1 and Q4 and the group of the switching elements Q2 and Q3 in the DC/AC part 32. Further, the change of a crest value in the AC voltage to be supplied to the starter part 33 can be achieved by regulating an action duty of the switching element Qx in the step-down chopper part 31.

More specifically, the switching element Qx of the step-down chopper part 31 is turned on and off on the basis of the switching frequency in response to the duty of the gate signal Gx output by the power control part 42, whereby the electric power to be supplied to the discharge lamp 10 is changed. For example, in the case where the power to be supplied to the discharge lamp 10 is intended to be raised, the power control part 42 carries out a control for raising the duty of the gate signal Gx so as to achieve a desired power value.

<Power Control Part 5>

In the present embodiment, the power control part 5 is provided with a power computing part 51, a comparison part 53 and a pulse width modulation circuit 55.

A voltage signal $V_L$ which is detected by the voltage dividing resistances (R1, R2), and a current signal $I_L$ which is detected by the resistance Rx are input to the power computing part 51, and the power computing part 51 generates a power signal $W_L$ on the basis of these signals. The comparison part 53 compares a standard power value with the power signal $W_L$ output from the power computing part 51, and outputs a result of comparison to the pulse width modulation circuit 55. The pulse width modulation circuit 55 changes a duty ratio of the gate signal Gx corresponding to the result of comparison from the comparison part 53.

The voltage signal $V_L$ corresponds to the voltage which is generated by division of the DC voltage stepped down by the step-down chopper part 31 (that is, the applied voltage) by the voltage dividing resistances (R1, R2), and is the voltage corresponding to the lamp voltage. Further, the current signal $I_L$ is the current corresponding to the lamp current. Therefore, the power control part 5 has a function of a feed-back control so that the applied power is fixed, that is, the power consumption in the discharge lamp 10 is fixed.

<Pulse Generation Part 4>

As mentioned above, the pulse generation part 4 is provided with the frequency setting part 41 and the pulse generation circuit 43. The pulse generation circuit 43 generates the pulse P having the frequency which is set by the frequency setting part 41, and outputs to the driver 35 of the DC/AC conversion part 32. As mentioned above, the switching control for the switching elements Q1 to Q4 of the DC/AC conversion part 32 is carried out on the basis of the pulse P. The frequency setting part 41 can be constructed, for example, by a microcomputer.

Figure 3A:
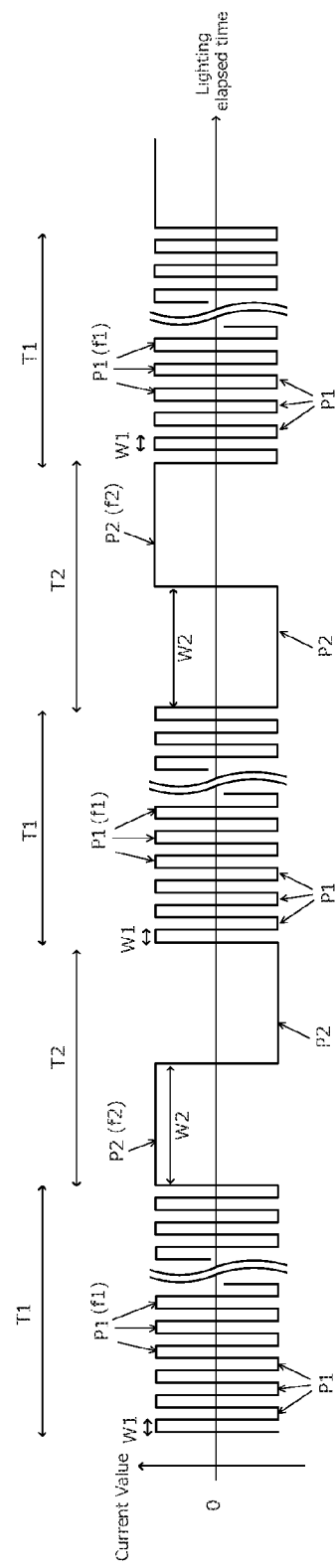
FIG. 3A is a view showing an example of a waveform of a lamp current which is supplied from the discharge lamp lighting apparatus.

A description will be given of the pulse P output from the pulse generation part 4 with reference to FIGS. 3A to 3C. FIGS. 3A to 3C are views showing an example of a waveform of the pulse P output from the pulse generation part 4, that is, a lamp current waveform of the discharge lamp 10. FIGS. 3A to 3C respectively correspond to the waveforms of the pulse P in different time zones.

The pulse P generated from the pulse generation part 4 repeats a cycle of outputting a pulse P1 (corresponding to "first pulse") having a fundamental frequency f1 (a pulse width W1) for a predetermined period T1 and thereafter outputting a pulse P2 (corresponding to "second pulse") having a lower frequency f2 (a pulse width W2) than the fundamental frequency for a predetermined period T2. This point is the same as the content mentioned above with reference to FIG. 9. In FIGS. 3A, 3B and 3C, the frequency f2 of the second pulse P2 is different, that is, the pulse width W2 and the output period T2 are also different.

For example, the frequency setting part 41 can employ a structure which is provided with a memory storing a continuous pulse number of the first pulse P1, a continuous pulse number of the second pulse P2, and the frequency f1 of the first pulse P1. Further, as mentioned later, the frequency setting part 41 sets the frequency f2 of the second pulse P2 corresponding to the value of the applied voltage.

Further, the pulse generation circuit 43 is provided with a counter which counts the pulse number of the pulse P output from the pulse generation circuit 43, and can be structured such that the information of the counter is transmitted to the frequency setting part 41. At this time, the frequency setting part 41 can recognize a timing for switching from the first pulse P1 to the second pulse P2 and a timing for switching from the second pulse P2 to the first pulse P1 on the basis of the information relating to the pulse number given from the counter and the information stored in the memory, and can output the information of each of the frequencies (f1, f2) to the pulse generation circuit 43.

In the above, the information of a pulse width W1 of the first pulse P1 and a pulse width W2 of the second pulse P2 may be used in place of the information of the frequency f1 of the first pulse P1 and the frequency f2 of the second pulse P2.

The frequency f1 (the fundamental frequency) of the first pulse P1 corresponds to the fundamental frequency at a time of stationarily lighting the discharge lamp 10, and is a frequency, for example, selected from a range between 60 and 1000 Hz. Further, the second pulse P2 is a low frequency which is inserted after a predetermined number of first pulses P1 is continuously output, and the frequency f2 is a frequency, for example, selected from a range between 5 and 200 Hz which is a lower frequency than the fundamental frequency.

The second pulse P2 is preferably inserted at a time interval which is equal to or longer than 0.01 seconds and equal to or shorter than 120 seconds. In other words, it is preferable to set the period T1 to a range which is equal to or longer than 0.01 seconds and equal to or shorter than 120 seconds, and it is more preferable to set the period T1 to a range which is equal to or shorter than 0.01 seconds and equal to or shorter than 2 seconds. If the pulse P2 is inserted to a time interval which is shorter than 0.01 seconds, the protrusion 21 forming a starting point of an arc is heated too much, and there is a risk that a shape of the protrusion 21 is deformed or may be eliminated in some cases. On the contrary, if the time interval is set to be too longer, a state in which the minute protrusions are kept formed at a peripheral position of the protrusion 21 is maintained long, and there is a risk that the arc starting from the minute protrusions are formed during this time.

In the examples of FIGS. 3A to 3C, the period T2 for which the second pulse P2 is output is set to a period of one cycle of the pulse P2. More specifically, the pulse generation circuit 43 is structured so as to output one pulse having a positive polarity and one pulse having a negative polarity in the period T2. However, an output aspect of the pulse P2 is not limited to this aspect.

For example, it is possible to employ a structure in which the pulse generation circuit 43 outputs the first pulse P1 only for the predetermined period T1, thereafter outputs the second pulse P2 only for a half cycle length T2, further outputs the first pulse P1 only for the period T1, and then outputs the second pulse P2 only for a half cycle length T2 while changing its polarity from the preceding one. Further, the second pulse P2 included in the pulse P output from the pulse generation circuit 43 may be structured such as to be included over one cycle or more time, for example, 1.5 cycles of the second pulse P2. However, since electrode may be heated too much and the shape of the protrusions 21 serving as the arc starting point may be changed when the applying time of the second pulse P2 is elongated too much, the second pulse P2 is preferably kept within one period within one cycle.

Further, as mentioned above, the frequency setting part 41 sets the frequency f2 of the second pulse P2 corresponding to the value of the applied voltage, in the discharge lamp lighting apparatus 1 according to the present embodiment. Specifically, in the case that the applied voltage coincides with the predetermined reference value, the frequency f2 of the second pulse P2 is set to a predetermined reference frequency. Further, in the case that the value of the applied voltage goes beyond the reference value, the frequency f2 of the second pulse P2 is set to a frequency which is lower than the reference frequency. On the other hand, in the case that the value of the applied voltage falls below the reference value, the frequency f2 of the second pulse P2 is set to a frequency which is equal to or less than the reference frequency.

In the discharge lamp lighting apparatus 1, the frequency setting part 41 is given the voltage signal $V_L$ from the power supply part 3 (refer to FIG. 2). As mentioned above, the voltage signal $V_L$ corresponds to a voltage generated by division of the DC voltage, which is stepped down by the step-down chopper part 31, by the voltage dividing resistances (R1, R2), and is a voltage corresponding to the applied voltage. Therefore, the frequency setting part 41 can detect the applied voltage on the basis of the voltage signal $V_L$. The frequency setting part 41 may be structured so as to store a relationship between the applied voltage and the frequency f2 of the second pulse P2 in the form of a data table, or may be structured so as to store such a relationship in the form of a predetermined relational expression.

A description will be given of the case that the frequency setting part 41 sets the frequency f2 of the second pulse P2 in such a manner that the frequency is lowered as the value of the applied voltage comes away from the reference value both when the applied voltage goes beyond the reference value and when the applied voltage falls below the reference value, as an example. In this case, the frequency f2 of the second pulse P2 indicates the highest frequency (corresponding to "reference frequency" mentioned above) when the applied voltage coincides with the reference value.

FIG. 4 shows an example of a graph indicating a relationship between the applied voltage and the second pulse P2, and shows a relationship between the applied voltage and the pulse width W2 of the second pulse P2 here. In the example in FIG. 4, the pulse width W2 of the second pulse P2 is the shortest when the applied voltage is 68 V which is the reference value, and the frequency f2 at this time is the highest. The numerical values shown in FIG. 4 are just examples.

In the case that the relationship between the applied voltage and the second pulse P2 is under the relationship shown in FIG. 4, FIG. 3B corresponds to an example of the waveform of the pulse P, for example, when the applied voltage is 68 V. Further, FIG. 3C corresponds to an example of the waveform of the pulse P, for example, when the applied voltage is 90 V. FIG. 3A corresponds to an example of the waveform of the pulse P, for example, when the applied voltage is 55 V.

Among FIGS. 3A to 3C, the pulse width W2 of the second pulse P2 is the shortest and the frequency f2 of the second pulse P2 is the highest, in FIG. 3B. The frequency f2 of the second pulse P2 shown in FIG. 3A is lower than the frequency f2 of the second pulse P2 shown in FIG. 3B. The frequency f2 of the second pulse P2 shown in FIG. 3C is lower than the frequency f2 of the second pulse P2 shown in FIG. 3A.

Here, the reference value is set to 68 V, but the reference value is a value which is appropriately set depending on a design of the discharge lamp 10 itself, for example, a design of the electrodes (20*a*, 20*b*), an internal volume of the light emitting part 11 (the discharge vessel) and an amount of sealed mercury.

[Operation]

A description will be given below of the fact that a service life is elongated in the case that the discharge lamp 10 is lighted by the discharge lamp lighting apparatus 1 mentioned above, compared to the case of being lighted by the conventional lighting apparatus, with reference to examples.

(Example 1)

An example 1 was provided by the case that the discharge lamp 10 was lighted by the discharge lamp lighting apparatus 1 mentioned above. The frequency of the first pulse P1 was set to 370 Hz (the pulse width was about 1.4 ms). Further, the specification of the discharge lamp 10 is as follows.

(Specification of Lamp)
Rated power: 450 W
Rated voltage: 85 V
Internal volume of light emitting part: 250 mm$^3$
Interelectrode distance: 1.5 mm
Sealed material: mercury 0.29 mg/mm$^3$, argon gas 13 kPa, halogen $10^{-6}$-$10^{-2}$ μmol/mm$^3$ (Comparative Example 1)

Figure 5A:
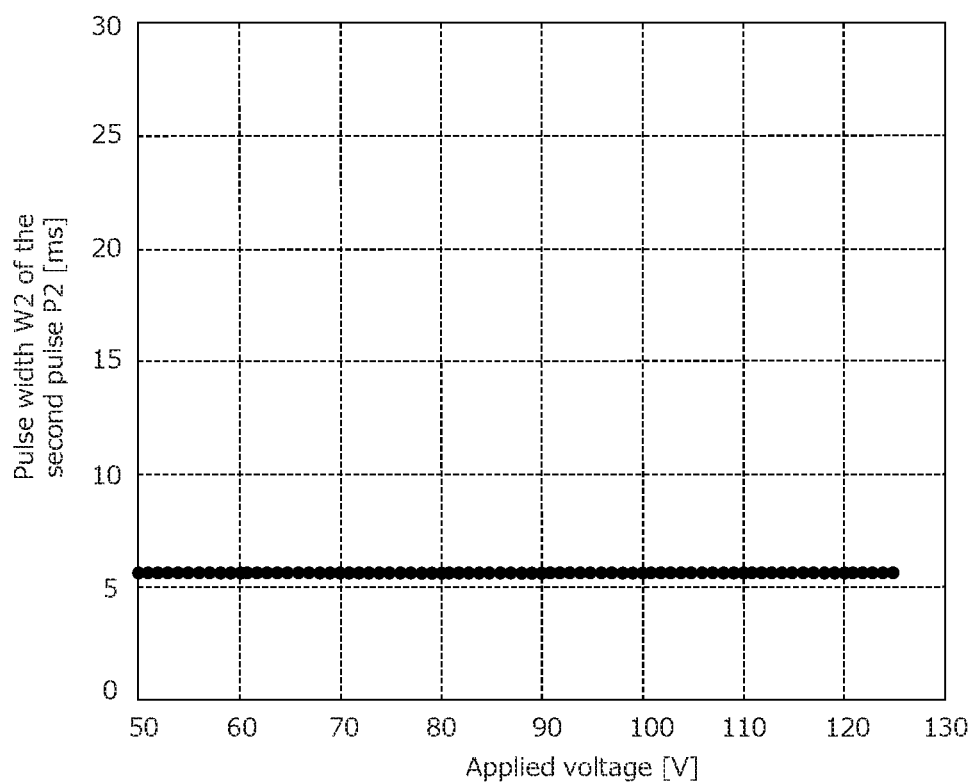
FIG. 5A is a graph showing the relationship between the applied voltage and the second pulse P2 in the case of a comparative example 1.

A comparative example 1 was provided by the case that the frequency f2 of the second pulse P2 was set to a fixed value regardless of the value of the applied voltage, that is, regardless of the value of the lamp voltage. The other points were the same as those in the example 1. FIG. 5A is a graph indicating the relationship between the applied voltage and the second pulse P2 in the comparative example 1, similarly to FIG. 4.

(Comparative Example 2)

Figure 5B:
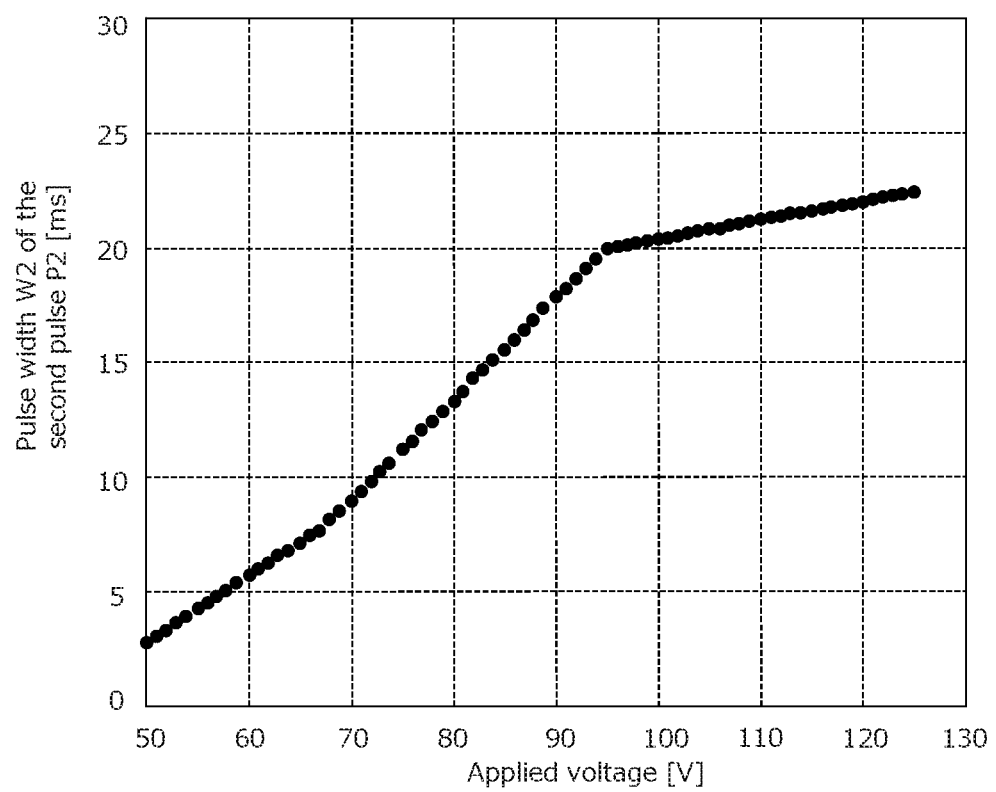
FIG. 5B is a graph showing the relationship between the applied voltage and the second pulse P2 in the case of a comparative example 2.

A comparative example 2 was provided by the case that the frequency f2 of the second pulse P2 was adjusted in such a manner as to lower the frequency f2 of the second pulse P2 (come up the pulse width W2) when the applied voltage came up, and come up the frequency f2 of the second pulse P2 (lower the pulse width W2) when the applied voltage fell down. In the comparative example 2, the lighting method disclosed in Patent Document 2 was assumed. The other points were the same as those in the example 1. FIG. 5B is a graph indicating the relationship between the applied voltage and the second pulse P2 in the comparative example 2, similarly to FIG. 4.

(Result Analysis)

FIGS. 6(*a*) and 6(*b*) are graphs for comparing changes with age of the applied voltage and the illuminance maintenance rate when the discharge lamp is lighted by each of the lighting apparatuses in the example 1, the comparative example 1, and the comparative example 2. FIG. 6 (*a*) is a graph indicating a relationship between the applied voltage and the elapsed time, and FIG. 6(*b*) is a graph indicating a relationship between the illuminance maintenance rate and the elapsed time. Here, "illuminance maintenance rate" is a value indicating a rate of brightness at each of the time points in the case that the brightness just after lighting is set to a reference (100%).

According to FIG. 6(*a*), comparing the time for which the applied voltage reaches 80 V, the time was about 400 hours in the comparative example 1 and was about 2000 hours in the comparative example 2. On the contrary, the time was about 5000 hours in the example 1. The applied voltage after 5000 hours from the lighting start was 150 V in the comparative example 1, and 130 V in the comparative example 2. On the contrary, the applied voltage was only 80 V in the example 1.

The uprising speed of the applied voltage is the fastest in the comparative example 1, and the uprising speed of the applied voltage is suppressed in the comparative example 2 in comparison with the comparative example 1. Therefore, an effect obtained by lowering the frequency f2 of the second pulse P2 along with the increase of the applied voltage can be confirmed.

Since the current (the lamp current) supplied to the discharge lamp 10 is lowered by the increase of the applied voltage, the amount of heat supplied to the electrode is lowered in the case that the time for which the polarity of the supplied current is not reversed (one polarity is maintained) is fixed. In this case, the effect of eliminating the protrusions or irregularities in the other parts than the electrode tip is lowered. In the case of the comparative example 2, the frequency f2 of the second pulse P2 is lowered along with the increase of the applied voltage, and the time for which the polarity of the current applied is not reversed (one polarity is maintained) is elongated with the increase of the applied voltage. As a result, it is possible to compensate the reduction of the amount of the supplied heat caused by the reduction of the lamp current, and it is deemed that the uprising speed of the applied voltage can be suppressed in comparison with the comparative example 1.

Figure 6A:
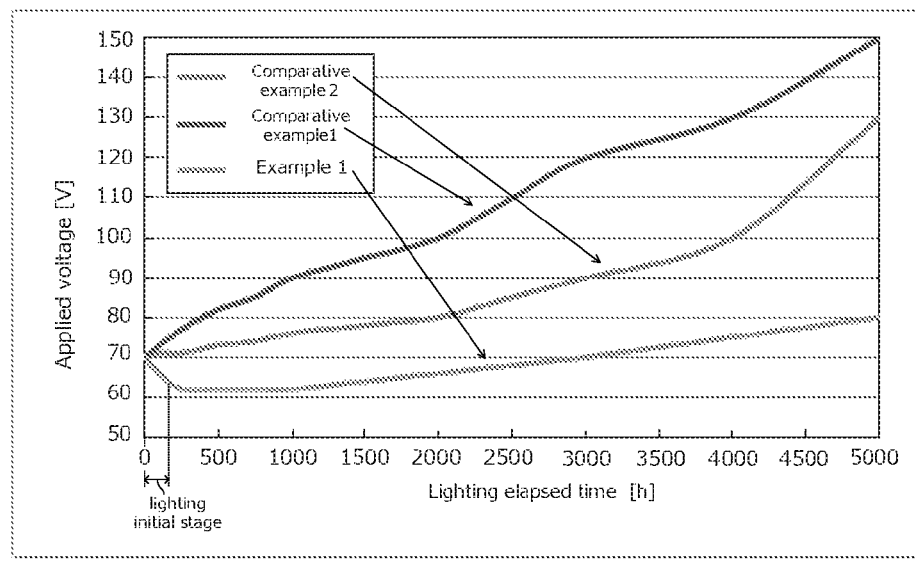
FIGS. 6(a) and 6(b) are graphs for comparing changes with age of an applied voltage and an illuminance maintenance rate at a time of lighting the discharge lamp by each of the lighting apparatuses in an example 1, the comparative example 1 and the comparative example 2.
Figure 6B:
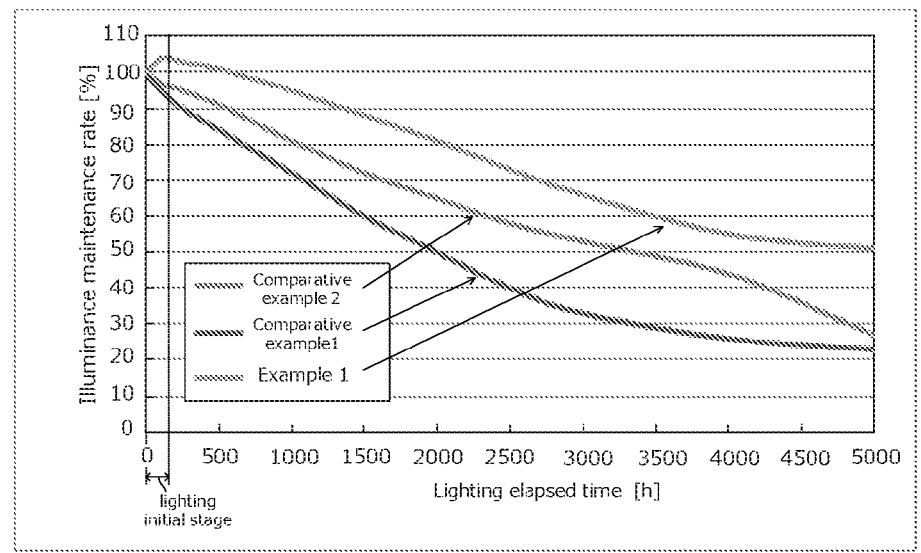

Comparing the time required for the illuminance maintenance rate to be lowered to 60% in FIG. 6(b), the time was about 1500 hours in the comparative example 1, was about 2300 hours in the comparative example 2, and was about 3500 hours in the example 1. The illuminance maintenance rate after 5000 hours from the lighting start was about 23% in the comparative example 1, about 27% in the comparative example 2, and was 50% in the example 1.

According to FIG. 6(b), the decreasing speed of the illuminance maintenance rate is the fastest in the comparative example 1, and the decreasing speed is suppressed in the comparative example 2 in comparison with the comparative example 1. In view of the above, the illuminance maintenance rate tends to be lowered as the distance between the electrodes is elongated, in comparison with the time point at the initial stage of the lighting, and it can be found that the decreasing speed of the illuminance maintenance rate can be suppressed in the comparative example 2 where the speed that the distance between the electrodes is elongated can be suppressed, in comparison with the comparative example 1.

Further, according to FIGS. 6(a) and 6(b), it can be found that the uprising of the applied voltage and the reduction of the illuminance maintenance rate can be greatly suppressed in the example 1, in comparison with the comparative example 1 and the comparative example 2. More specifically, according to the discharge lamp lighting apparatus 1 mentioned above, it is suggested that the long service life of the discharge lamp can be achieved, particularly compared to the method of the comparative example 2.

FIG. 6(a) shows that the applied voltage is lowered in the example 1 at the lighting initial stage from the lighting start to the elapse of about 200 hours, differently from the comparative example 1 and the comparative example 2. Further, in FIG. 6(b), the illuminance maintenance rate comes up more at the lighting initial stage than that just after the lighting in the example 1, differently from the comparative example 1 and the comparative example 2. As mentioned above, in the example 1, the frequency f2 is further lowered by making the pulse width W2 of the second pulse P2 long in the case that the applied voltage is lower than the reference value in the frequency setting part 41. Since the electrode material sufficiently exists at the lighting initial stage, the amount of heat supplied to the electrode is increased by lowering the frequency f2 of the second pulse P2 so as to elongate the time where the same polarity is maintained, so that an amount of the evaporated electrode material is increased. Therefore, an amount of the electrode material which is thereafter aggregated is increased, and the distance between the electrodes becomes shorter. As a result, the applied voltage is further lowered. The above content appears in the result of FIGS. 6(a) and 6(b).

In other words, according to the method of the example 1, since it is possible to make the time for which the discharge lamp 10 can be lighted by the low applied voltage long by making the distance between the electrodes short at the initial stage, it is possible to elongate the time for which the high illuminance maintenance rate can be secured. Further, it is possible to suppress the speed where the distance between the electrodes is elongated, and accordingly, the long service life of the discharge lamp can be achieved in comparison with the conventional one.

[Other Embodiments]

A description will be given below of the other embodiments.

Figure 7:
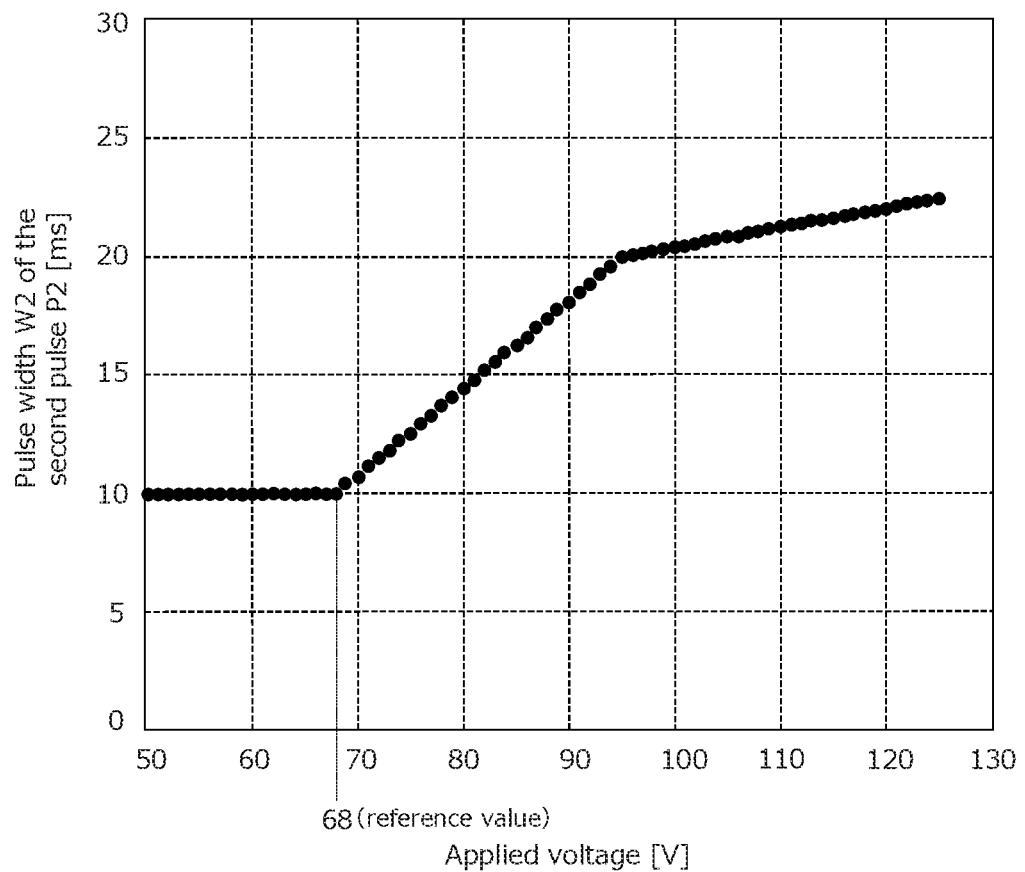
FIG. 7 shows another example of the graph showing the relationship between the applied voltage and the second pulse P2.

<1> In the above-described embodiment, the description is given by assuming the case where the pulse width W2 of the second pulse P2 is the shortest (the frequency f2 is the highest) when the applied voltage is the reference value, and the pulse width W2 becomes longer (the frequency f2 becomes lower) as the applied voltage falls below the reference value (refer to FIG. 4). However, the pulse width W2 of the second pulse P2 may be set to be equal to the pulse width W2 at the reference value in the case that the applied voltage falls below the reference value. FIG. 7 shows an example of a graph indicating the relationship between the applied voltage and the second pulse P2 at this time.

Further, in the above-described embodiment, the description is given by assuming the case where the pulse width W2 of the second pulse P2 becomes longer as the applied voltage comes away from the reference value when the applied voltage exceeds the reference value (refer to FIG. 4). However, under the description that the pulse width of the second pulse P2 when the applied voltage is X [V] is W2(X), a relationship of W2(X0)<W2(X1)≤W2(X2) may establish when X0<X1<X2 in two points of the applied voltages X1 [V] and X2 [V] which are greater than the reference value X0 [V]. In the same manner, a relationship of W2(X0)≤W2(X4)≤W2(X3) may establish when X3<X4<X0 in two points of the applied voltages X3 [V] and X4 [V] which are smaller than the reference value X0 [V].

<2> As mentioned above, the constant power control is assumed to be carried out for the discharge lamp 10. However, there exists a lighting method of switching the lighting power value itself (hereinafter, refer to "eco mode"), for example, the case of using the projector device while reducing the brightness on the screen. In one example, the lighting power is 120 W in the eco mode when the lighting power in the normal time (hereinafter, refer to "normal mode") is 135 W.

Figure 8:
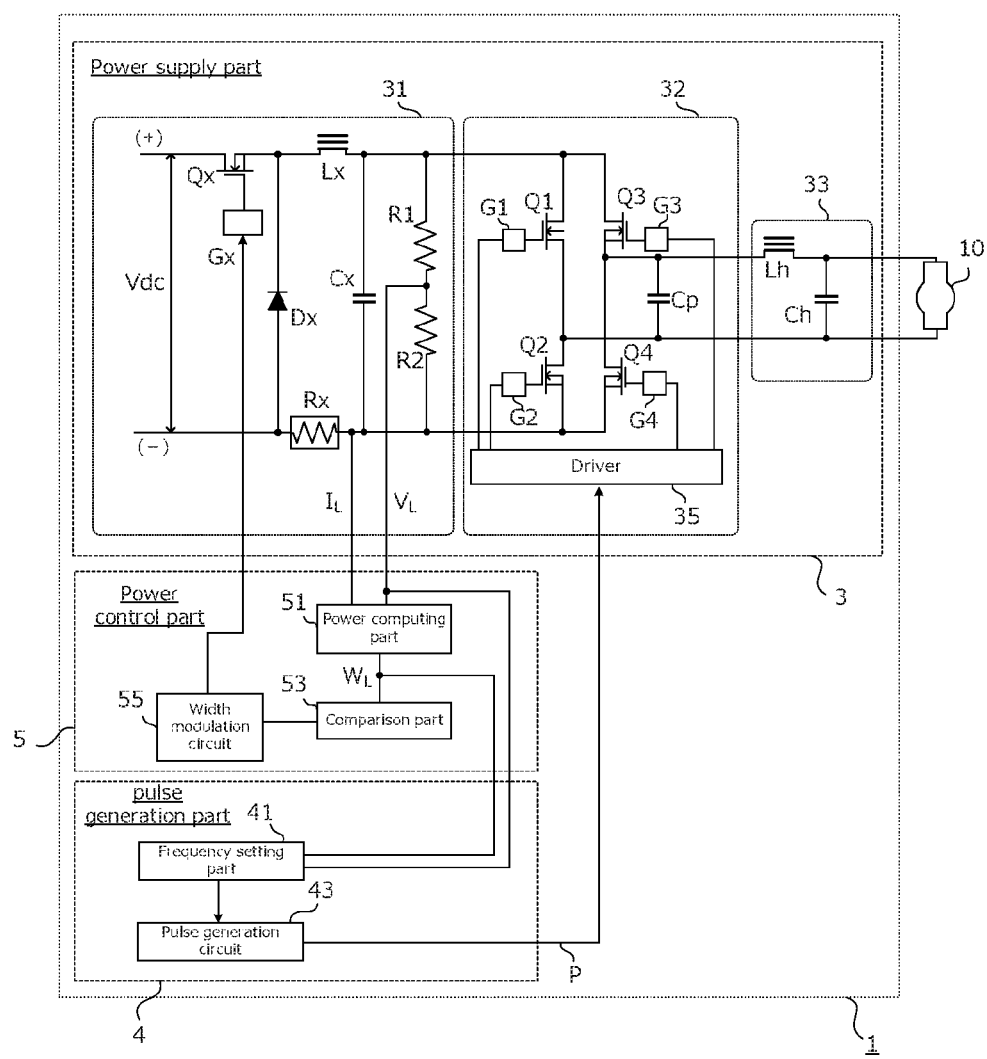
FIG. 8 is another circuit block diagram schematically showing the structure of the discharge lamp lighting apparatus.

In this case, the power supplied to the discharge lamp 10 is lowered in the eco mode, and accordingly, the lamp current is lowered and the heat flowing into the electrode is reduced. Therefore, the frequency setting part 41 may be structured so as to receive the power signal $W_L$ from the power computing part 51, and the frequency f2 (the pulse width W2) of the second pulse P2 may be structured so as to be changed depending on the value of the power signal $W_L$, as shown in FIG. 8. At this time, the pulse width W2 of the second pulse P2 may be structured so as to be set to a rate according to a change rate of the power signal $W_L$. A method for setting the frequency f2 of the second pulse P2 after switching from the normal mode to the eco mode and after switching from the eco mode to the normal mode is the same as that in the above-described embodiment.

<3> In the above-described embodiment, the description is given on the assumption that the pulse generation part 4 repeats the cycle of outputting the first pulse P1 for the predetermined time and thereafter outputting the second pulse P2 for the predetermined period. However, the pulse generation part 4 may be structured so as to output a third pulse having a lower frequency, in place of the second pulse P2, at a predetermined timing and thereafter again return to the cycle of outputting the first pulse P1 and the second pulse P2. The third pulse is exceptionally output only one time every several tens of cycles to several hundreds of cycles, in place of the second pulse P2, for the purpose of eliminating the moving protrusions.

DESCRIPTION OF REFERENCE SIGNS

1: discharge lamp lighting apparatus
3: power supply part
4: pulse generation part
5: power control part
10: discharge lamp
11: light emitting part
12: sealing part
13: metal foil
14: outer lead
20*a*, 20*b*: electrode
21: protrusion
29*a*, 29*b*: head part of electrode
30*a*, 30*b*: shaft part of electrode
31: step-down chopper part
32: DC/AC conversion part
33: starter part
35: driver
41: frequency setting part
43: pulse generation circuit
51: power computing part
53: comparison part
55: width modulation circuit

The invention claimed is:

1. A discharge lamp lighting apparatus for supplying alternating current to a discharge lamp having a pair of electrodes arranged to be opposite to each other within a discharge vessel in which a predetermined gas is sealed, the discharge lamp lighting apparatus comprising:
    a pulse generation part that generates pulse; and
    a power supply part that transforms supplied DC voltage to DC applied voltage, converts the DC applied voltage into the alternating current corresponding to a frequency of the pulse, and supplies the alternating current to the discharge lamp, wherein
    the pulse generation part is structured to alternately output a first pulse and a second pulse that has a lower frequency than the first pulse, set a frequency of the second pulse to a predetermined reference frequency when a value of the applied voltage coincides with a predetermined reference value, set the frequency of the second pulse to a lower frequency than the reference frequency when the value of the applied voltage exceeds the reference value, and set the frequency of the second pulse to a frequency that is equal to or lower than the reference frequency when the value of the applied voltage falls below the reference value.

2. The discharge lamp lighting apparatus according to claim 1, wherein, when the value of the applied voltage falls below the reference value, the pulse generation part lowers the frequency of the second pulse as the value of the applied voltage comes away from the reference value.

3. The discharge lamp lighting apparatus according to claim 1, further comprising:
    a power control part that detects the applied voltage and applied power, and controls a ratio of transformation at a time of transforming from the DC voltage to the applied voltage so as to maintain the applied power which is detected to a predetermined power value, wherein
    the pulse generation part is provided with a frequency setting part that sets a frequency, and a pulse generation circuit that generates and outputs the pulse having the frequency set by the frequency setting part, and
    the frequency setting part sets the frequency of the second pulse corresponding to a value of the applied voltage which is detected based on a signal from the power control part.

4. The discharge lamp lighting apparatus according to claim 2, further comprising:
    a power control part that detects the applied voltage and applied power, and controls a ratio of transformation at a time of transforming from the DC voltage to the applied voltage so as to maintain the applied power which is detected to a predetermined power value, wherein
    the pulse generation part is provided with a frequency setting part that sets a frequency, and a pulse generation circuit that generates and outputs the pulse having the frequency set by the frequency setting part, and
    the frequency setting part sets the frequency of the second pulse corresponding to a value of the applied voltage which is detected based on a signal from the power control part.

\* \* \* \* \*